United States Patent [19]

Sisler et al.

[11] 4,072,798

[45] Feb. 7, 1978

[54] BIOELECTRIC NEUTRALIZATION OF ACID WATERS

[75] Inventors: Frederick D. Sisler, Washington, D.C.; Frank E. Senftle, Chevy Chase, Md.

[73] Assignee: The United States of America as represented by the Secretary of the Interior, Washington, D.C.

[21] Appl. No.: 819,518

[22] Filed: July 26, 1977

[51] Int. Cl.² .......................................... H01M 8/16
[52] U.S. Cl. ....................................................... 429/2
[58] Field of Search ........................................... 429/2

[56] References Cited

U.S. PATENT DOCUMENTS 3,228,799  1/1966  Rohrback ................................ 429/2
3,266,943  8/1966  Goldner .................................. 429/2

Primary Examiner—John H. Mack
Assistant Examiner—H. A. Feeley
Attorney, Agent, or Firm—William S. Brown; Donald A. Gardiner

[57] ABSTRACT

An apparatus to be used in a process for bioelectric neutralization of a body of water having a bottom of anaerobic mud and an acid supernatant liquid, the apparatus comprising a buoy riding on the surface of the water, and upper electrode preferably of carbon suspended from the buoy in the acid supernatant liquid, a lower electrode preferably of iron embedded in the anaerobic mud and a flexible, insulated electrical conductor preferably an insulated copper cable, conductively attached to the upper and lower electrodes. A plurality of sets of apparatus may be used spaced apart from each other in the body of water.

24 Claims, 5 Drawing Figures

BIOELECTRIC NEUTRALIZATION OF ACID WATERS

BACKGROUND OF THE INVENTION

When iron sulfides in a coal mine are exposed to water containing oxygen and sulfur-oxidizing bacteria, oxidation takes place, which results in the formation of sulfuric acid. The acid mine water so formed constitutes a formidable water-pollution problem that seriously affects the thousands of miles of streams and surface acreage in the United States. In 1972, more than 4 million tons per year of sulfur acids were estimated to have drained from active and abandoned coal mines. The additional strip-mining for coal brought about by the energy crisis could result in even more serious pollution problems. In addition, many streams and rivers are polluted by acid effluents from manufacturing processes. If the pH of such rivers falls below about 5–6, these rivers are no longer able to support marine life. It has been previously suggested that since acid strip-mine lakes take a long time to recover naturally, an energy-source material for the bacteria in the lakes is needed in order to hasten lake recovery and the reestablishment of essentially neutral water. The addition of sewage sludge into an acid strip-mine lake increases the rate of recovery of the lake. The rate of recovery of an acid strip-mine lake can be greatly increased using the biochemical fuel cell principle by the addition of electrodes and a simple external circuit in the lake. In addition, it may be possible to obtain a modest amount of electrical power for plant operation, a practical means of disposal of sewage sludge, and recovery of some free sulfur.

A basic biochemical fuel cell is described in Sisler U.S. Pat. No. 3,477,879.

OBJECTS OF THE INVENTION

It is therefore an object of this invention to provide a process for neutralizing acid-polluted water found in strip-mine lakes and in rivers which accept the acid effluent from manufacturing processes, and to provide an apparatus suitable for the process.

DESCRIPTION OF THE INVENTION

Figure 1:
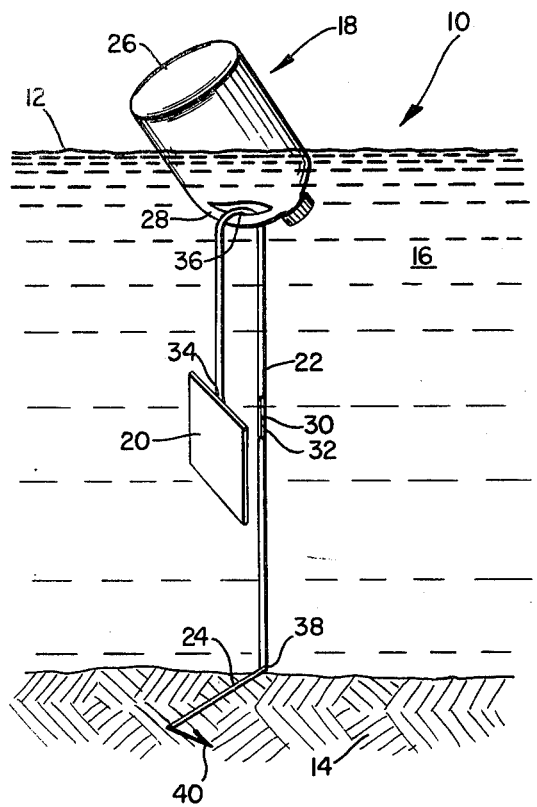
FIG. 1 shows an apparatus of the present invention.

These objects are accomplished by providing a process for the bioelectrical neutralization of a body of water having a bottom of anaerobic mud and an acid supernatant liquid comprising the step of placing in the body of water an apparatus comprising: a buoy, an upper electrode suspended from the buoy, a flexible insulated elelctrical conductor conductively attached to the upper electrode, and a lower electrode conductively attached to the insulated electrical conductor. The buoy rides on the surface of the water, the upper electrode is suspended in the acid supernatant liquid, and the lower electrode is embedded in the anaerobic mud. It is essential in this process to have a layer of anaerobic mud in which to embed the electrode. In acid sulfate-containing water, anaerobic bacteria reduce the sulfate to hydrogen sulfide. The anaerobic bacteria are largely represented by the genus desulfovibrio. Sulfate ions are used by the anaerobic sulfate-reducing bacteria as an oxidant for oxidation of organic matter, this reaction furnishing the energy for cell metabolism. Sulfate is reduced to sulfide, and it appears that two electrons are released and migrate towards the surface. Here the electrons combine with molecular oxygen and water to form hydroxyl ions, the surface waters becoming slightly more alkaline. Once hydrogen sulfide is released into the water by the sulfate-reducing bacteria, the remaining processes are electromechanical in nature and require no biological catalyst. Thus, biological and electrochemical processes combine to provide a natural fuel cell and a flow of electric current is made available for other uses, for example to run meters to monitor the process.

The acid supernatant liquid can be strip-mine waste water, acid-polluted river water, or any other acid-polluted water generally created as the result of industrial processes.

The buoy can be any buoy which floats on the water which has a support from which to suspend the upper electrode. In a preferred embodiment of the present invention, the buoy is an empty, sealed plastic container with an integrally formed loop-shaped handle, through which the electrically conducting cable which connects the upper electrode and the lower electrode passes. Thus, the lower electrode is embedded in the anaerobic mud and is connected conductively to a cable which passes through the loop-shaped handle of the buoy, which cable is then connected conductively to the upper electrode. Alternatively, the upper electrode can be suspended from the buoy by a suitable means and the two electrodes can be directly connected by a flexible conductor.

The upper electrode is preferably made of carbon in any form; graphite sheeting is suitable. The lower electrode is preferably of iron since it is inexpensive and easily obtainable. However, the lower electrode can be made of copper coated with nickel since copper alone is toxic to algae, nickel, platinum, silver, or gold. These are all much more expensive than using an iron electrode. It is possible to use carbon for the lower electrode also. Anthracite coals which conduct electricity would be suitable, but bituminous coals are not conductive. However, coal suffers from a number of disadvantages as it is not easy to attach the conductor firmly to it nor is it easy to imbed the coal in the mud. The preferred species for the lower electrode is iron. Scrap iron can be used. A heavy iron grid is a good electrode and it is preferred that the electrode have the configuration of barbed hooks such as are found on grappling hooks or anchors. An iron anchor or grappling hook makes a preferred lower electrode since an object of such configuration embeds itself easily in the anaerobic mud at the bottom of the body of water.

The flexible insulated electrical conductor which connects the upper electrode and the lower electrode can be any insulated conducting connector. The preferred embodiments are plastic-coated copper cable or coaxial cable. The insulated electrical conductor can either connect the two electrodes directly or can pass through the loop-shaped handle of the buoy which rides on the surface of the water, thus in a simple manner the electrical conductor connects the upper electrode, the buoy and the lower electrode.

Figure 4:
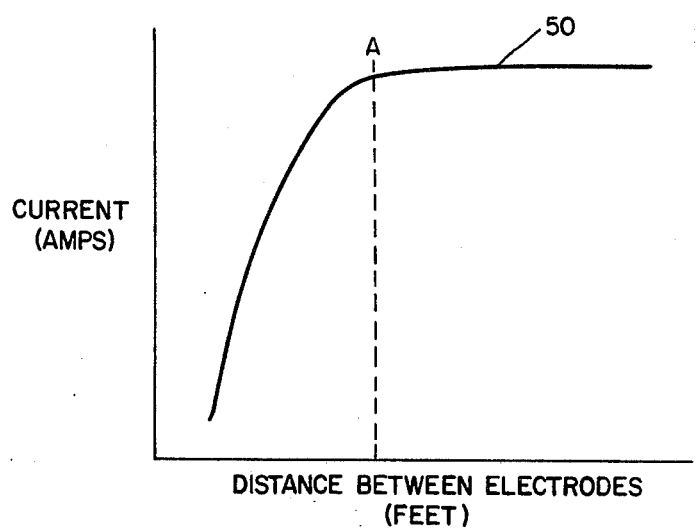
FIG. 4 shows a graph of the distance between the lower electrodes of a plurality of sets of apparatus, and current flowing in the conductor.

It is envisaged that in a preferred usage of the process, a plurality of sets of apparatus would be used in one body of water. This would enable a more rapid neutralization of the body of water. Each set of apparatus is spaced from the next set of apparatus at a distance such that the measure of the current flowing in the insulated electrical conductor no longer increases with increasing distance between the embedded lower electrode of each set of apparatus. FIG. 4 shows a graph of increasing distance between the lower electrodes of two adjacent sets of apparatus against current flowing in the conductor. It can be seen that the current achieves a maximum value and remains approximately at this value with increasing distance of electrodes. The preferred spacing of these sets of apparatus is at the point where the current reaches its maximum value. In a most preferred embodiment of the invention, a body of water would contain several sets of this apparatus spaced at this distance from each other. In practice, one set of apparatus hastens the neutralization of the body of water, two sets of apparatus speeds the process up even more, and as long as the sets of apparatus are spaced distant from each other by at least the distance necessary for reaching maximum current in the conductor, the process will be satisfactory. The sets of apparatus should not be spaced closer to each other than this distance.

Figure 2:
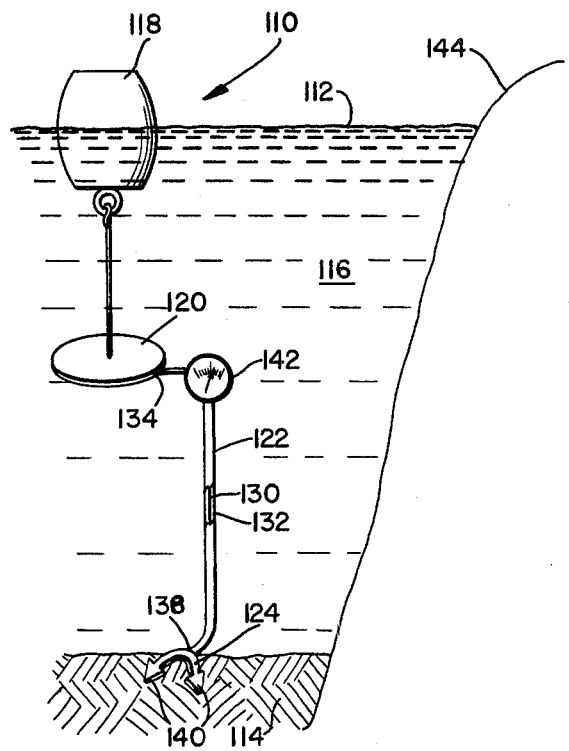
FIG. 2 shows another apparatus of the present invention.

In the use of a plurality of sets of apparatus in a flowing river, the pH of the water may progressively increase from apparatus to apparatus. It may be necessary if the river bed is rocky or stony to dig out pits on the river bed into which anaerobic mud can be placed. If the anaerobic mud is placed in pits, it is unlikely to be washed away. The first set of apparatus is placed close to the source of acid water in the river. This will commence the neutralization of the water. The second set of apparatus is downstream of the first set of apparatus, and water flows from the first set of apparatus to the second set of apparatus. This second set of apparatus further neutralizes the water which has flowed into its region from the first set of apparatus, and similarly this further neutralized water flows onto a possible third set of apparatus futher down the river. As many sets of apparatus as are necessary to raise the pH of the water to an adequate level to support marine life can be used. Support of fish and other marine life is a simple indication of the relative cleanliness of the river. FIG. 2 shows an apparatus which has been used in the laboratory to demonstrate this process.

When a set of apparatus has been placed in a body of water, it can be left there indefinitely as the apparatus is non-corroding.

The current flowing in the insulated electrical conductor can be diverted to flow through monitoring equipment which can be on the bank of the lake or river. Free sulful which can collect as a yellow film on the surface of the water due to the reduction of the sulfate ion can be collected by skimming. The body of water may be stocked with fish or other marine life which would be an indication of the continuing efficiency of the apparatus.

Acid bodies of water may take many months or years to become neutral on their own. There are many factors which influence the rate of neutralization of acid waters. The addition of sewage sludge to anaerobic mud on the bottom of the body of water increases the rate of neutralization. Higher temperatures, such as in summer time, increase the speed of neutralization of the water, and larger surface area of the electrodes also increase the rate of neutralization. It wll be obvious to one skilled in the art that a suitable size for the electrodes depends upon their location, the flow of the water, and any transportation problems.

The distance apart of the upper and lower two electrodes in each set of apparatus is not critical to the efficiency of the apparatus. The lower electrode must be embedded in the anaerobic mud, the upper electrode must be in the acid supernatant liquid. The upper electrode may be either towards the top or the bottom of the layer of acid supernatant liquid, and since there will be flow in the body of water, this distance may vary.

It should be appreciated that a benefit of this process is that it uses up sewage sludge which can be added to the anaerobic mud. The sewage sludge, or organic matter, is a source of carbohydrate for the desulfovibrio bacteria. Thus, the sewage is cleaned up as well as the river or lake being neutralized.

This invention is further described by reference to the figures.

Referring now to the drawings and in particular to FIG. 1 there is disclosed an apparatus 10 for the bioelectrical neutralization of a body of water 12 having a bottom 14 of anaerobic mud and an acid supernatant liquid 16. The apparatus comprises a buoy 18, an upper electrode 20, a conductor 22, and a lower electrode 24. The buoy 18 comprises an empty sealed plastic container 26 with an integrally formed looped shaped handle 28. The electrode 20 is of carbon and is suspended from the buoy 18 in the supernatant liquid 16. The electrical conductor 22 is flexible and is insulated. The conductor 22 comprises a copper cable 30 with a plastic coating 32. The first end 34 of the conductor 22 is conductively attached to the upper electrode 20. The intermediate portion 36 of the conductor 22 passes through the looped shaped handle 28 of the buoy 18. The lower electrode 24 is of iron and is conductively attached to the second end 38 of the conductor 22. The lower electrode 24 has a configuation comprising barbed hooks 40.

FIG. 2 shows another apparatus 110 suitable for practicing the invention. Apparatus 110 is placed in a body of water 112 having a bottom 114 of anaerobic mud and an acid supernatant liquid 116. The apparatus 110 comprises a buoy 118, an upper electrode 120, a conductor 122, and a lower electrode 124. The buoy 118 rides on the surface of the body of water 112, and from it is suspended the upper electrode 120. The conductor 122 comprises a copper cable 130 with an insulating coating 132. The first end 134 of the conductor 122 is attached to the upper electrode 120. The second end 138 of the conductor 122 is attached to the lower electrode 124 which has a configuration of barbed hooks 140 which are embedded in the bottom 114 of anaerobic mud. The conductor 122 can have inserted into its length an ammeter 142 which can be used to measure the current flowing in the conductor 122. This ammeter 142 can be led by conductor 122 to a position on the bank 144 of the body of water 112.

Figure 3:
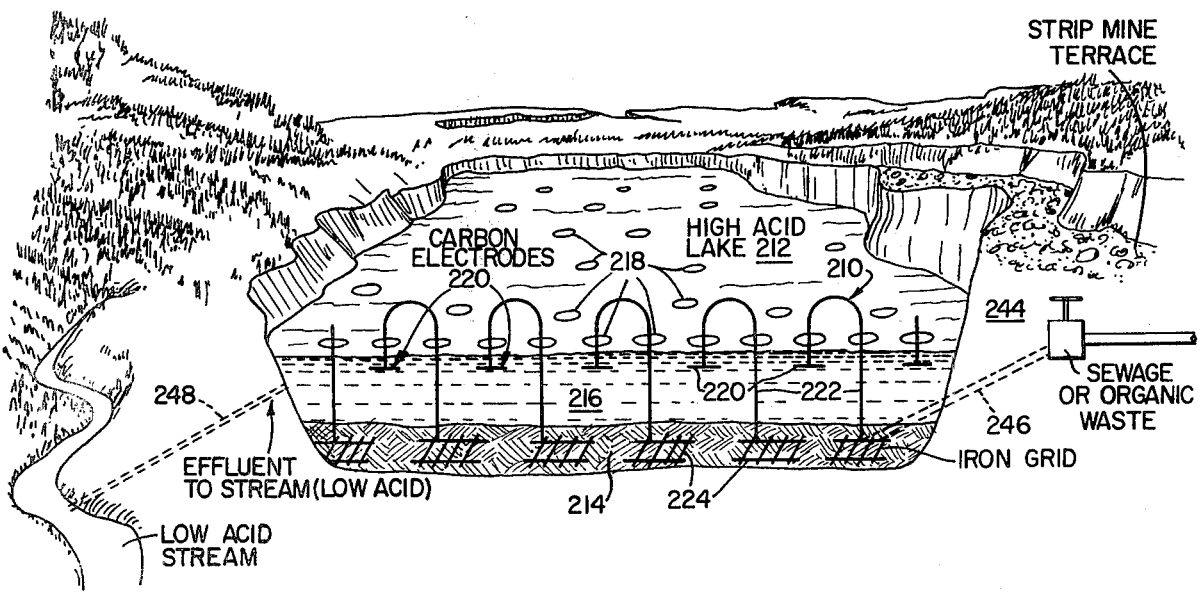
FIG. 3 shows the use of a plurality of sets of apparatus in an acid lake.

FIG. 3 shows a plurality of sets of apparatus in use in an acid strip mine lake. The sets of apparatus used can be either those used in FIG. 1 or FIG. 2. A typical set of apparatus 210 is placed in a body of water 212 comprising a bottom 214 of anaerobic mud and an acid supernatant liquid 216 in the form of acid mine waste water. The apparatus 210 comprises a buoy 218 from which is suspened an upper electrode 220 and a lower electrode 224, these electrode being connected by an insulated conductor 222. A source of sewage or other organic waste 246 is fed onto the bottom 214 of anaerobic mud. From the opposite side of the lake to the inlet of sewage waste 246 is an outlet 248 from the body of water 212 which water is found to be of suitable quality to support marine life.

FIG. 4 shows a curve 50 showing the relationship between the distance between the lower electrodes of a plurality of sets of apparatus and current flowing in the conductor. The lower electrodes may be spaced apart at any distance greater than the point A on the curve, preferably at approximately distance A.

The invention is further illustrated by the following example in which all parts and percentages are by weight unless otherwise indicated. This non-limiting example is illustrative of certain embodiments designed to teach those skilled in the art how to practice the invention and to represent the best mode contemplated for carrying out the process of the invention.

EXAMPLE

Figure 5:
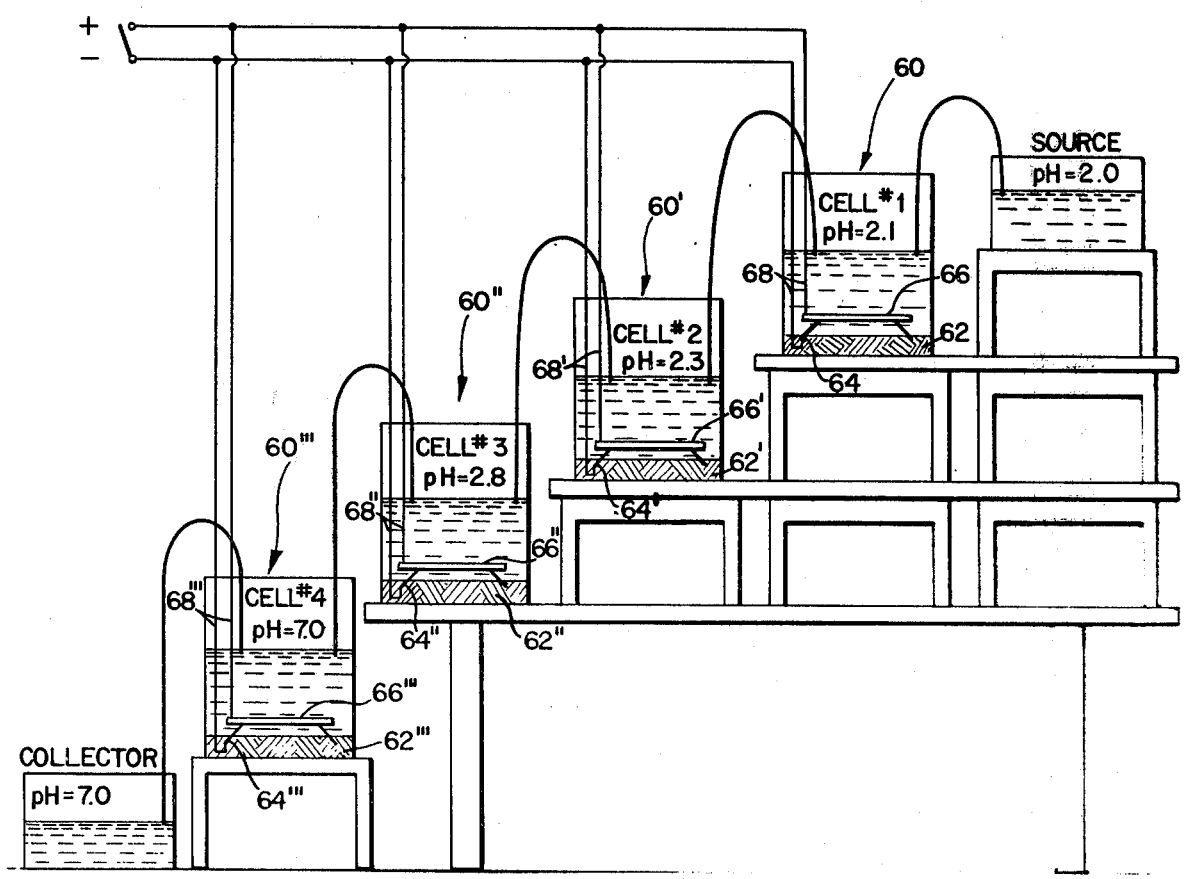
FIG. 5 shows a laboratory simulation of the use of a plurality of sets of apparatus.

In a laboratory experiment shown in FIG. 5, designed to show the usage of a plurality of sets of apparatus, a series of four 25-liter cells were set up, each cell simulating a set of apparatus in body of acid water. The cell containing the most acidic water simulates the set of apparatus nearest to the acid source in the body of water occurring naturally. Each of the 25-liter cells, 60, 60', 60", 60'", contained anaerobic mud 62, 62', 62", 62'", an iron lower electrode 64, 64', 64", 64'", and a carbon upper electrode 66, 66', 66", 66'", connected by a conductor 68, 68', 68", 68'". These cells were arranged in the laboratory so that each was gravity fed by the preceding cells, as is shown in FIG. 5. A reservoir containing simulated acid mine or river water of pH 2 was fed into the first cell. The effluent from the last cell was found to be of pH 7 and the flow rate was established at 6 liters per day. The pH of the liquid in the intermediate cells was found to be 2.1, 2.3, 2.8, and 7.0 showing a progressive increase in pH. Water of pH 7 would be well able to support marine life.

Based on these laboratory observations, one can project to a field-scale facility, for example, assuming four holding ponds having a capacity of 1400 cubic meters each. The laboratory data can be scaled to yield a flow rate of about 336,000 liters per day in a practical application.

In the aforementioned laboratory flow-through system, experiments were made in which small motors and timers continuously operated on current generated by the cells during the neutralization process. By scaling these experiments, one can approximate the amount of available power. For instance, if each of the 25-liter cells were scaled up to a 300 meter diameter pond equipped with the proper electrodes, it is not unreasonable to realize a power production of 2-4 kilowats per pond. It should be noted, that if electrical energy is removed from the system, the effectiveness of the acid neutralization is reduced. A balance between efficiency of the system and the need for monitoring the process can easily be reached. The reaction rate approximately doubles with each 10° C in temperature, therefore the temperature of the season of the year must be considered.

Although the invention has been described in considerable detail with reference to certain preferred embodiments thereof, it is to be understood that variations and modifications can be effected within the spirit and scope of the invention as described above and as defined in the appended claims.

What is claimed:

1. A process for the bioelectrical neutralization of a body of water having a bottom of anaerobic mud and an acid supernatant liquid, said liquid consisting essentially of acid sulfate-containint water, comprising the step of placing in the body of water an apparatus comprising:
    A. a buoy;
    B. an upper electrode suspended from the buoy;
    C. a flexible insulated electrical conductor conductively attached to the upper electrode; and
    D. a lower electrode conductively attached to the insulated electrical conductor;
    wherein the buoy rides on the surface of the body of water;
    wherein the upper electrode is suspended in the acid supernatant liquid;
    wherein the lower electrode is embedded in the anaerobic mud.

2. The process of claim 1 wherein the body of water is a lake of acid mine waste water.

3. The process of claim 1 wherein the body of water is an acid-polluted river.

4. The process of claim 1 wherein the buoy has an integrally formed loop-shaped handle.

5. The process of claim 1 wherein the upper electrode is a carbon electrode.

6. The process of claim 1 wherein the insulated electrical conductor is a plastic coated copper cable.

7. The process of claim 6 wherein the copper cable is a coaxial cable.

8. The process of claim 1 wherein the lower electrode is an iron electrode.

9. The process of claim 8 wherein the lower electrode has a configuration comprising barbed hooks.

10. The process of claim 1 wherein a plurality of sets of apparatus are placed in the body of water.

11. The process of claim 10 wherein each set of apparatus is spaced from each next set of apparatus at a distance such that the measure of the current flowing in the insulated electrical conductor no longer increases with increasing distance between the embedded lower electrodes of each set of apparatus.

12. A process for the bioelectrical neutralization of a body of water having a bottom of anaerobic mud and an acid supernatant liquid, said liquid consisting essentially of acid sulfate-containing water, by placing in the body of water a plurality of sets of apparatus each set of apparatus comprising:
    A. a buoy;
    B. an upper electrode suspended from the buoy;
    C. an insulated electrical conductor conductively attached to the upper electrode; and
    D. a lower electrode conductively attached to the insulated electrical conductor said lower electrode being embedded in said anaerobic mud;
said process comprising
    spacing each set of apparatus from each next set of apparatus at a distance such that the measure of the current flowing in the insulated electrical conductor no longer increases with increasing distance between the embedded lower electrodes of each set of apparatus.

13. The process of claim 12 wherein the current flowing in the insulated electrical conductor is diverted to flow through apparatus used to monitor the process.

14. A process for the bioelectrical neutralization of a body of water having a bottom of anaerobic mud and an acid supernatant liquid said liquid consisting essentially of an acid sulfate-containing water, comprising the steps of placing in the body of water a plurality of sets of apparatus each set of apparatus comprising:
  A. a buoy comprising an empty, sealed, plastic container with an integrally formed loop-shaped handle;
  B. an upper electrode comprising carbon suspended from the buoy;
  C. a flexible, insulated electrical conductor comprising plastic coated copper cable, a first end of said conductor being conductively attached to the upper electrode, a second end of said conductor passing through the loop-shaped handle of the buoy; and
  D. a lower electrode comprising iron conductively attached to said second end of the flexible, insulated electrical conductor said lower electrode being of a configuration comprising barbed hooks embedded in said anaerobic mud;

said process comprising the steps of:
  I. floating the buoy in the water;
  II. attaching the upper electrode to said first end of the flexible insulated electrical conductor with conductive contact between the upper electrode and the electrical conductor;
  III. passing said second end of the flexible insulated electrical conductor through the loop-shaped handle of the buoy;
  IV. attaching said second end of the flexible insulated electrical conductor to the lower electrode with conductive contact between said electrical conductor and said lower electrode;
  V. embedding the barbed hooks of the lower electrode in the anaerobic mud such that a current flows between the lower electrode and the upper electrode through the insulated electrical conductor;
  VI. measuring the current flowing in the insulated electrical conductor; and
  VII. spacing each set of apparatus from each next set of apparatus at a distance such that the measure of the current flowing in the insulated electrical conductor no longer increases with increasing distance between the embedded lower electrodes of each set of apparatus.

15. An apparatus for the bioelectrical neutralization of a body of water having a bottom of anaerobic mud and an acid supernatant liquid, said liquid consisting essentially of acid sulfate-containing water, such apparatus comprising:
  A. a buoy;
  B. an upper electrode suspended from the buoy;
  C. a flexible insulated electrical conductor conductively attached to the upper electrode; and
  D. a lower electrode conductively attached to the insulated electrical conductor;
  wherein the buoy has sufficient reserve buoyancy to ride on the surface of the body of water;
  wherein the upper electrode is suspended in the acid supernatant liquid;
  wherein the lower electrode is embedded in the anaerobic mud.

16. The apparatus of claim 15 wherein the body of water is a lake of acid mine waste water.

17. The apparatus of claim 15 wherein the body of 2ater is an acid-polluted river.

18. The apparatus of claim 15 wherein the buoy has an integrally formed loop-shaped handle.

19. The apparatus of claim 15 wherein the upper electrode is a carbon electrode.

20. The apparatus of claim 15 wherein the insulated electrical conductor is a plastic-coated copper cable.

21. The apparatus of claim 15 wherein the copper cable is a coaxial cable.

22. The apparatus of claim 15 wherein the lower electrode is an iron electrode.

23. The apparatus of claim 15 wherein the lower electrode has a configuration comprising barbed hooks.

24. An apparatus for the bioelectrical neutralization of a body of water having a bottom of anaerobic mud and an acid supernatant liquid, said liquid consisting essentially of acid sulfate-containing water, said apparatus comprising:
  A. a buoy comprising an empty, sealed, plastic container with an integrally formed loop-shaped handle;
  B. an upper carbon electrode suspended from the buoy in the supernatant liquid;
  C. a flexible, insulated electrical conductor comprising plastic coated copper cable, a first end of said conductor being conductively attached to the upper electrode, the intermediate portion of said conductor passing through the loop-shaped handle of the buoy; and
  D. a lower iron electrode conductively attached to said second end of the flexible, insulated electrical conductor said lower electrode being of a configuration comprising barbed hooks embedded in said anaerobic mud.

* * * * *